United States Patent [19]
Wijnen

[11] Patent Number: 4,714,176
[45] Date of Patent: Dec. 22, 1987

[54] LIQUID SUPPLY RESERVOIR

[75] Inventor: Peter J. A. Wijnen, AP Horst, Netherlands

[73] Assignee: Oce-Nederland B.V., Venlo, Netherlands

[21] Appl. No.: 49,011

[22] Filed: May 11, 1987

Related U.S. Application Data

[63] Continuation of Ser. No. 815,567, Jan. 2, 1986.

[30] Foreign Application Priority Data

Jan. 24, 1985 [NL] Netherlands ............... 8500188

[51] Int. Cl.$^4$ .................................. B67D 5/22
[52] U.S. Cl. ...................... 222/51; 222/464; 222/567; 73/308; 200/84 C
[58] Field of Search .......... 141/94, 95; 200/84 C, 200/81.9 M; 73/308, 313; 340/624; 222/51, 68, 192, 464, 566, 567, 64

[56] References Cited

U.S. PATENT DOCUMENTS

| | | | |
|---|---|---|---|
| 2,141,638 | 12/1938 | Bean | 222/464 |
| 3,242,474 | 3/1966 | Gast et al. | 200/84 C |
| 3,266,312 | 8/1966 | Coleman et al. | 73/313 |
| 3,366,276 | 1/1968 | Fridley | 200/84 C |
| 3,534,785 | 10/1970 | Bensen | 141/382 |
| 3,558,020 | 1/1971 | Russell | 222/416 |
| 4,028,512 | 6/1977 | Fiddler | 200/84 C |
| 4,480,469 | 11/1984 | Tice | 73/308 |

Primary Examiner—H. Grant Skaggs
Attorney, Agent, or Firm—Reed Smith Shaw & McClay

[57] ABSTRACT

An improved liquid-supply reservoir in a liquid-using machine such as a copier is described. The improved reservoir is provided with a pipe and a liquid-level sensing device as one unit, which unit is detachably secured in an opening at the top of the reservoir. A flexible conduit, which has one end associated with the liquid-using machine, can be passed through the reservoir opening such that the other end is close to the base of the reservoir whereby liquid is conducted from the reservoir to the machine or the reverse. Freely slideable floats for sensing a minimum and/or a maximum liquid-level in the reservoir are secured in a recess on the outside of the pipe.

5 Claims, 3 Drawing Figures

LIQUID SUPPLY RESERVOIR

This is a continuation of co-pending application Ser. No. 815,567 filed on Jan. 2, 1986.

BACKGROUND OF THE INVENTION

1. Field of the Invention

The present invention relates to a liquid-supply reservoir in a liquid-using machine, such as a diazo copying machine. The present invention is particularly directed to a liquid-supply reservoir in a copier. Typically, a liquid-supply reservoir has a closeable opening at the top in which there are detachably secured a pipe extending to near the base of the reservoir and a liquid-level sensing device.

2. Description of the Prior Art

U.S. Pat. No. 3,366,276 and British Patent No. 1,343,130 both describe liquid-supply reservoirs having a rigid pipe permanently secured therein which also acts as a guide means for a freely moveable float. This float is part of a liquid-level sensing means which entirely surrounds the rigid pipe. The pipe in British Patent No. 1,343,130 is completely sealed at the bottom whereas the pipe in U.S. Pat. No. 3,366,276 is provided with slots at the bottom such that the entire pipe acts as a liquid conduit. Neither pipe, however, can be removed thus preventing easy access to the reservoir.

British Patent Application No. 1,310,840 and Netherlands Patent Application No. 7,013,841 describe a liquid-supply reservoir provided with a top opening having a lid which fits thereon and which is provided with openings through which pass a liquid-level sensing device and pipes for introducing liquid into and taking liquid from the reservoir. The sensing device and pipes are separately secured to the lid. Similarly, German Auslegeschrift No. 1,655,517 describes a liquid-supply reservoir having a discharge pipe and a liquid-level sensor which are separately secured to a removeable lid of the reservoir.

As appears from British Patent No. 1,310,840 and German Auslegeschrift No. 1,655,517, at least the discharge pipe that is secured to the lid must be rigid and extend close to the base of the reservoir to enable the reservoir to be emptied. Upon replacement, the installed reservoir must be moved vertically downwards with respect to the lid for a distance which is at least equal to the maximum length by which the rigid pipe part, or the liquid-level sensing device, respectively, project into the reservoir. If the lid is secured to the reservoir by a screw connection, the reservoir will also have to be rotated to detach it from the lid.

A disadvantage of the above-described reservoir is that there must be a free space beneath the installed reservoir to enable the replacement movements of the reservoir to be carried out. During handling of the reservoir, liquid can easily be spilled. Another disadvantage is that the reservoir cannot rest on a fixed support. This is a distinct disadvantage when the reservoir is full and relatively heavy.

U.S. Pat. No. 3,698,454 and German Offenlegungschrift No. 3,402,506 both describe a liquid-supply reservoir wherein a rigid pipe used as a liquid conduit can be automatically inserted into or lifted out of the reservoir through a top opening. In addition to the complexity added by the automatic insertion and removal means, neither document has a liquid-level sensing device.

U.S. Pat. No. 3,817,274 describes a liquid-supply reservoir wherein a rigid pipe is secured in a support housing which fits into an opening at the top of the reservoir. It also has a float forming part of a liquid-level sensing device which entirely surrounds the rigid pipe and is freely moveable over almost the entire length of the pipe.

An object of this invention, therefore, is to provide a liquid-supply reservoir without the above disadvantages and to provide a liquid-supply reservoir which can easily be replaced.

SUMMARY OF THE INVENTION

Generally, the present invention provides a liquid-supply reservoir in a liquid-using machine, such as a copier having a closeable opening at the top in which are detachably secured both a pipe extending to near the base of the reservoir and a liquid-level sensing device and wherein the pipe has an open end outside the reservoir through which a flexible conduit, having one end connected to the liquid-using machine, can be passed such that the other end is close to the base of the reservoir and wherein the liquid-level sensing device forms a unit with the pipe. The effect of this integration is that when the reservoir is detached from the pipe, the reservoir can be held fast and does not need to move. The unit consisting of the pipe and the liquid-level sensing device preferably fits in the reservoir opening with only a slight amount of play. Consequently, the reservoir opening is utilized to its maximum and, for example, can be almost of the same size as a liquid conduit fitted through the pipe opening.

In a preferred embodiment, the pipe has a part with a reduced section forming a recess on one side of the outside of the pipe. The liquid-level sensing device comprises a low liquid-level sensor and/or a high liquid-level sensor. The sensors are secured to the pipe wall parts at the bottom and top of the recess, respectively.

Other features and advantages of a supply reservoir according to the present invention will be apparent from the following detailed description and with reference to the accompanying drawings.

DESCRIPTION OF THE PREFERRED EMBODIMENTS

Figure 1:
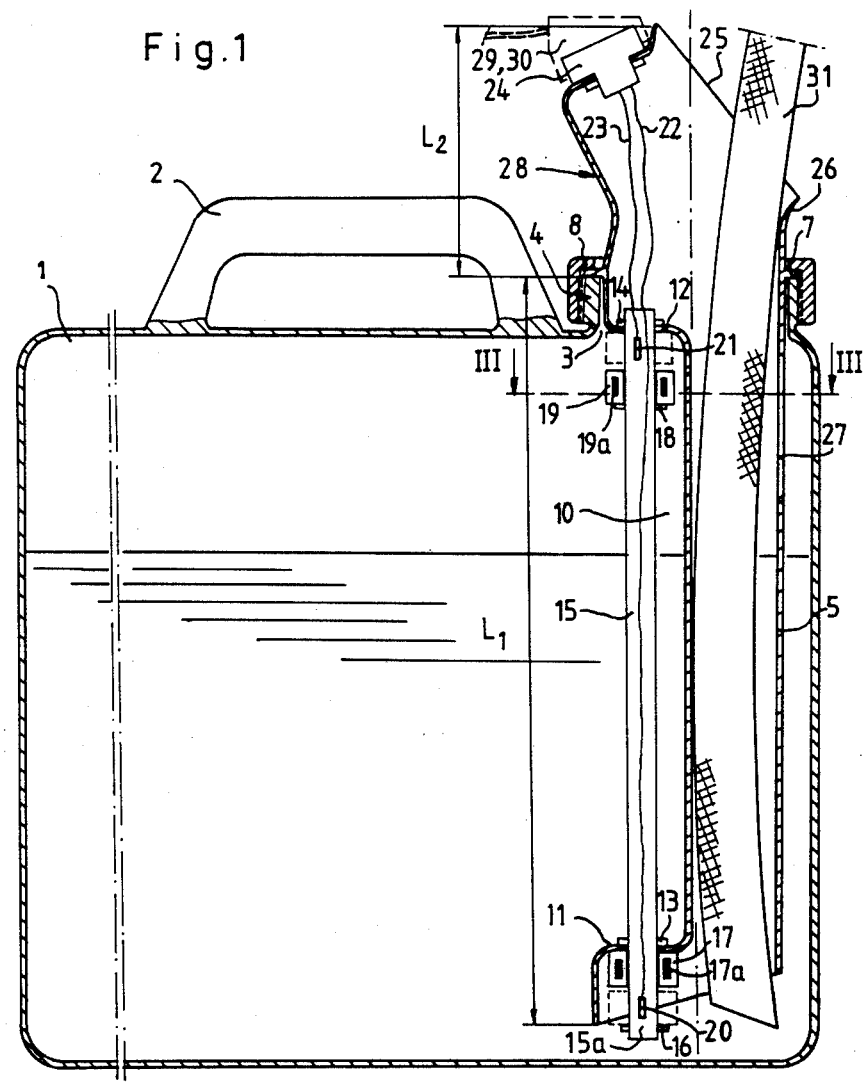
FIG. 1 is a section through a reservoir according to the invention.
Figure 2:
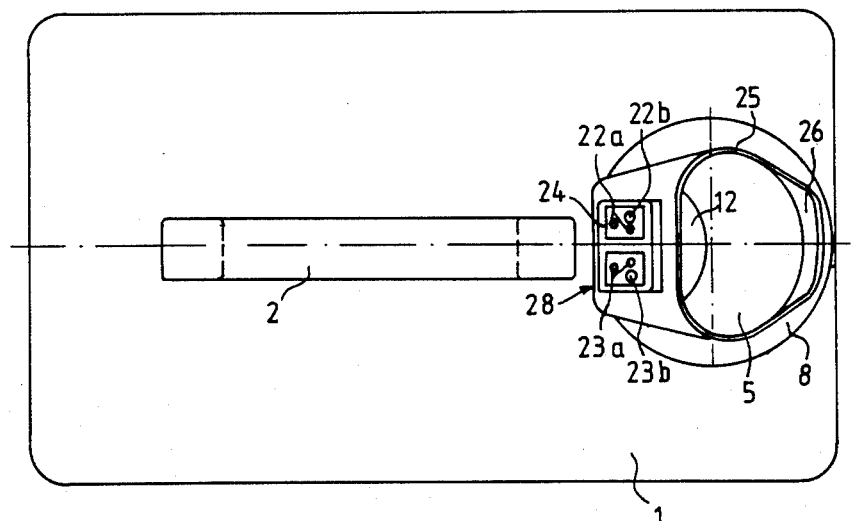
FIG. 2 is a top plan view of the reservoir shown in FIG. 1.

The supply reservoir represented in FIGS. 1 and 2 comprises a tank 1, the effective capacity of which is well over 11 liters. Tank 1 is provided with a handle 2 and a round opening 3 at the top. Around opening 3 is formed an upright edge 4 the outside of which is screwthreaded to receive a screw cap (not shown) which can close tank 1 when not in use.

The supply reservoir also comprises a substantially round pipe 5 which over length $L_1$ has a maximum cross-sectional area somewhat less than the cross-sectional area of opening 3. The length $L_1$ is somewhat shorter than the distance from the top of upright edge 4 to the base of tank 1. A collar 7 is formed around pipe 5 at a distance $L_1$ from the bottom of the pipe and rests on top of upright edge 4. Pipe 5 may be in any desired angular position and is detachably secured to tank 1 by means of a screw ring 8 which on the one hand rests on collar 7 and on the other hand cooperates with the screwthread on upright edge 4.

Figure 3:
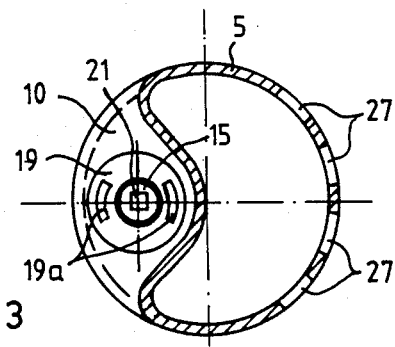
FIG. 3 is a section taken along line III—III of FIG. 1.

The pipe wall is bent inwards over a majority of the length $L_1$ to form a recess 10. FIG. 3, representing the cross-sectional plane of pipe 5 shows that recess 10 is typically formed by a V-shaped pipe wall part in the otherwise circular pipe wall. The pipe wall parts which form recess 10 preferably include an angle of 90° and extend from the circular pipe wall part to the center of the circle although it is evident that other shaped recesses may be used. Pipe 5, over the entire length $L_1$, fits with only a slight amount of play into round opening 3. This prevents liquid-level sensor 19 from being damaged because pipe 5 cannot be shifted laterally when passed through opening 3.

Recess 10 is closed at both the bottom and the top by pipe wall parts 11 and 12, respectively. Wall parts 11 and 12 are each provided with a hole 13 and 14, respectively, in which a guide tube 15 is secured by a known means (not shown). Guide tube end 15a extends beneath wall part 11. At some distance beneath wall part 11, a stop ring 16 is secured to guide tube end 15a. A float 17 is secured to guide tube end 15a and is freely slideable between stop ring 16 and wall part 11.

At some distance beneath wall part 12, a stop ring 18 is secured to guide tube 15. Between stop ring 18 and wall part 12, a float 19 is secured to be freely slideable on guide tube 15. Floats 17 and 19 are so adapted to the density of the liquid in tank 1 that in the immersed state they occupy a top position and in the nonimmersed state they occupy a bottom position.

A permanent magnet 17a is disposed in float 17 and a permanent magnet 19a is disposed in float 19. A reed switch 20 and 21, respectively, is fixed in guide tube 15 near each float and the switch's contacts close when they come into the range of influence of the magnet in the associated float. Preferably, this occurs when the float is level with its corresponding switch.

An electrical signal is thereby obtained when float 17 approaches the bottom position representing a minimum level in the reservoir, or when float 19 approaches the top position representing a maximum level in the reservoir. Reed switches 20 and 21 are respectively connected via leads 22 and 23 to contacts 22a and 23a of plug socket 24 which is secured to the upwardly inclined portion of outer wall part 28 which preferably projects a distance $L_2$ above collar 7.

Locating holes 22b and 23b are formed in plug socket 24 near each of the contacts 22a and 23a, respectively. Float switches 20 and 21, respectively, can be connected via plug socket 24 by means of plugs 29 and 30 to the control system of the liquid-using machine or copier for which the supply reservoir is used. Each plug 29 and 30, respectively, is provided with a locating pin which only fits into the corresponding locating hole, 22b or 23b, of its associated contact, 22a or 23a. As a result, plugs 29 and 30 cannot be interchanged.

Preferably, top edge 25 of pipe 5 lies in a plane which forms an angle of 45° to the longitudinal axis of pipe 5. Other angles, of course, can be used. The lowest part of top edge 25 is formed into a pouring spout 26. Openings 27 are formed in the top portion of pipe 5 which fits into the reservoir and facilitates pouring as will be explained hereinafter. Outer wall part 28 of pipe 5, situated opposite pouring spout 26, is so profiled that screw ring 8 can easily be pushed over the top of pipe 5 and against collar 7 where it is screwed.

To conduct liquid from the reservoir to a liquid-using machine or to introduce liquid into the reservoir from a liquid-using machine, a flexible conduit 31 associated with the machine is fitted into pipe 5.

If the above-described supply reservoir is used as a reservoir from which liquid is fed to the liquid-using machine, replacing the supply reservoir consists of either replacing an empty tank by a full tank or filling an empty tank. In the former case, hose 31 is taken out of pipe 5 and plugs 29 and 30 are removed from plug socket 24, whereupon the tank can be replaced. In the latter case, all that is necessary is to remove hose 31 from pipe 5 to enable the tank to be filled such as with a filling hose or a funnel fitted into pipe 5.

When the cable connecting plugs 29 and 30 to the control system is sufficiently long and flexible, the supply reservoir can be placed conveniently outside the liquid-using machine for filling with the plug connection remaining connected. If the plug connection remains connected during filling, the maximum level can be signalled on the liquid-using machine.

When the supply reservoir of the present invention is used to hold developing liquid in a copying machine, such as a diazo copying machine, the signalled minimum liquid level in the supply reservoir is set to 1 liter so that with a supply reservoir capacity of 11 liters it is possible to refill the reservoir with approximately 10 liters, a quantity which corresponds to the amount of liquid in which the normal packed quantity of developing powder is dissolved. It will be apparent that when the supply reservoir is used in this way there is no strict need for a maximum liquid-level sensor.

If the supply reservoir of the present invention, however, is used for collecting rather than supplying liquid used in a liquid-using machine, a minimum liquid-level sensor in the supply reservoir is unnecessary and all that is required is one maximum liquid-level sensor in the reservoir. When tank 1 is full and this is signalled by the maximum liquid-level detector, the full supply reservoir can easily be emptied. Once hose 31 has been removed from pipe 5 and plugs 29 and 30 are released, if necessary, the reservoir can easily be emptied by tilting it, whereupon the liquid flows via openings 27 from the tank chamber into pipe 5 and from there via pouring spout 26 out of the reservoir.

While presently preferred embodiments of the invention have been described and shown in the drawings with particularity, the invention may be otherwise embodied within the scope of the appended claims.

What is claimed is:

1. In a liquid-supply reservoir of a liquid-using machine having a closable opening at the top of the reservoir in which are detachably secured both a pipe extending to near the base of the reservoir and a liquid-level sensing device forming a unit with the pipe, which pipe has an open end outside the reservoir through which a flexible conduit having one end connected to the liquid-using machine can be passed such that the other end is close to the base of the reservoir, the improvement wherein a part of the pipe has a recess formed on one side of an outside wall of the pipe, the liquid-level sensing device comprises a sensor secured to the outside wall of the pipe near a termination of the recess such that the sensor within the recess fits completely therein and every part of the pipe and sensor unit fits in the closeable opening with a slight amount of play.

2. The improvement defined in claim 1 wherein the liquid-level sensing device comprises a sensor for low liquid levels positioned near the bottom termination of the recess and a sensor for high liquid levels positioned near the top termination of the recess, and wherein the pipe has a plug socket at an end outside the reservoir, which socket is provided with two groups of contacts, one connected to the low-level liquid sensor and the other connected to the highlevel liquid sensor such that each group of contacts can cooperate with only a plug of corresponding configuration and the plug associated with one group of contacts cannot fit the other group of contacts.

3. The improvement defined in claim 1 wherein the recess is formed by a V-shaped pipe wall part in an otherwise circular pipe wall when viewing a cross-section of the pipe.

4. The improvement defined in claim 1 wherein the pipe can be secured in any angular position and is provided with a collar which rests on the edge of the closeable opening, the open end of the pipe outside the reservoir is provided with a pouring spout, and at least one opening is formed in a wall of the pipe just below the top of the reservoir and on a side of the pipe which is the same as the pouring spout when viewed in the circumferential direction.

5. The improvement defined in claim 4 wherein the liquid-level sensing device comprises a sensor for low liquid levels positioned near the bottom termination of the recess and a sensor for high liquid levels positioned near the top termination of the recess, and wherein the pipe has a plug socket at an end outside the reservoir, which socket is provided with two groups of contacts, one connected to the low-level liquid sensor such that each group of contacts can cooperate with only a plug of corresponding configuration and the plug associated with one group of contacts cannot fit the other group of contacts.

* * * * *

UNITED STATES PATENT AND TRADEMARK OFFICE
CERTIFICATE OF CORRECTION

PATENT NO. : 4,714,176

DATED : December 22, 1987

INVENTOR(S) : Wijnen

It is certified that error appears in the above-identified patent and that said Letters Patent is hereby corrected as shown below:

Column 4, line 54: please delete --closable-- and substitute "closeable" therefor.

Column 5, line 11: please delete --highlevel-- and substitute "high-level" therefor.

Signed and Sealed this

Fifteenth Day of November, 1988

Attest:

DONALD J. QUIGG

*Attesting Officer*  *Commissioner of Patents and Trademarks*